No. 643,093. Patented Feb. 6, 1900.
J. C. HENRY.
ELECTRIC MOTOR.
(Application filed Aug. 27, 1892.)

(No Model.)

Witnesses
Wm H Courtland
A. C. Crue

Inventor
John C. Henry.
By Bentley + Blodgett
Attys

UNITED STATES PATENT OFFICE.

JOHN C. HENRY, OF WESTFIELD, NEW JERSEY.

ELECTRIC MOTOR.

SPECIFICATION forming part of Letters Patent No. 643,093, dated February 6, 1900.

Application filed August 27, 1892. Serial No. 444,306. (No model.)

*To all whom it may concern:*

Be it known that I, JOHN C. HENRY, a citizen of the United States, residing at Westfield, county of Union, State of New Jersey, have invented certain new and useful Improvements in Electric Motors, of which the following is a specification.

My invention relates to continuous-current electric motors and switches for controlling the same, and has especial reference to regulating the flow of currents through the two motors with which an electric railway-car is frequently equipped.

The object of the invention is to enable said motors to be run either bipolar or four-poled in series or in parallel, with the fields in series or in parallel and the armatures likewise, as hereinafter more fully explained.

Figure 1:
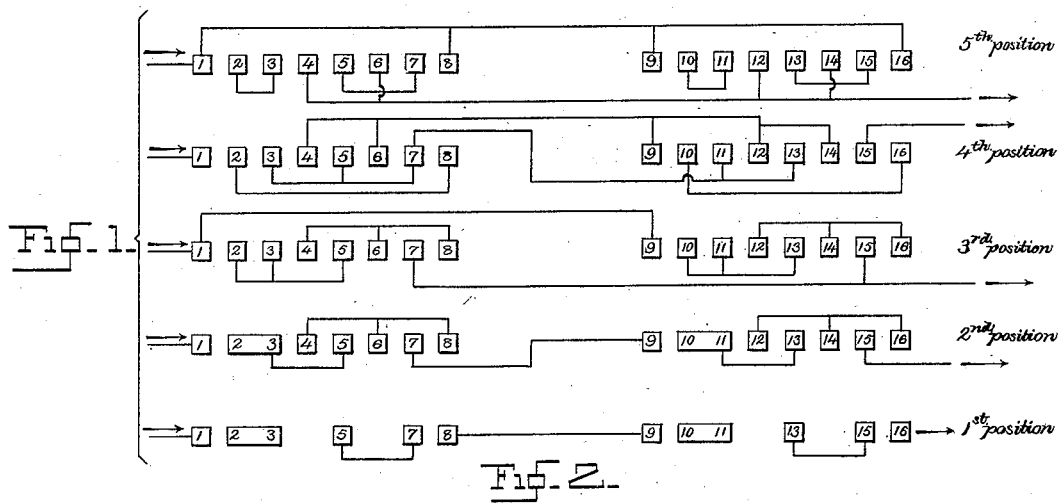
Figure 2:
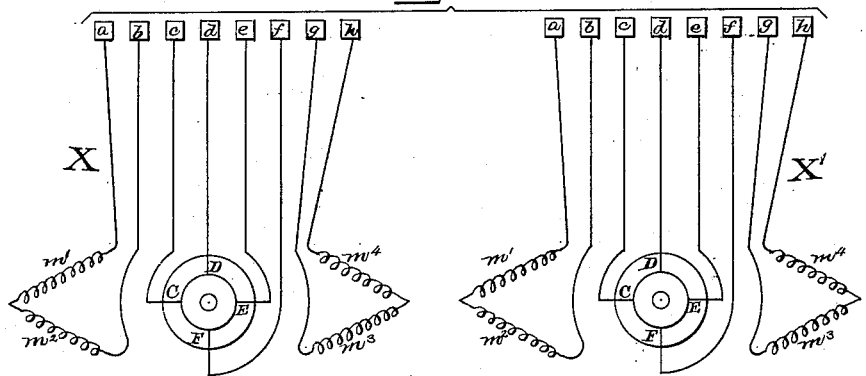
Figure 3:
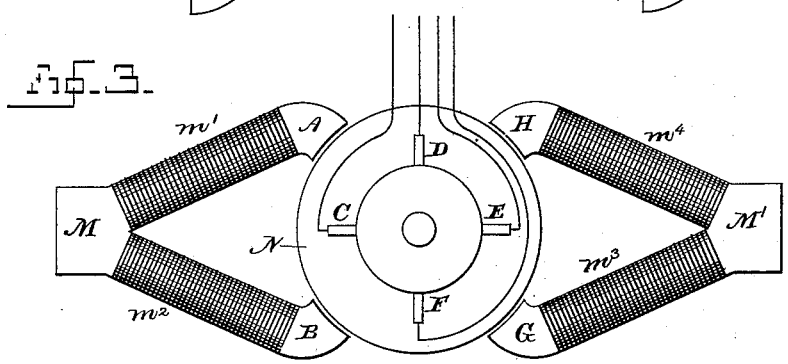
Figure 4:
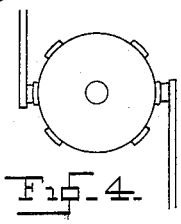

In the drawings, Figure 1 shows the several positions of the switch. Fig. 2 shows the arrangement of the field and armature windings in the two motors. Fig. 3 is a side elevation of one of the motors. Fig. 4 is an end view of the switch.

The pole-pieces A B G H of the field-magnets M M' are arranged symmetrically around the armature N, which has four commutator-brushes C D E F arranged midway between the pole-pieces. The terminals of the magnet M are at $a\,b$ and those of the magnet M' are at $g\,h$. The brushes are connected, respectively, with the terminals $c\,d\,e\,f$.

The switch may be of any suitable construction; but I prefer to use such a one as is shown in my pending application, Serial No. 368,595, consisting, essentially, of a cylinder carrying contact-pieces to close the circuit through the several terminals, the contact-pieces being properly connected to give the desired direction to the current. The contact-pieces are arranged in five groups, sixteen in each group, to correspond with the sixteen terminals of the two motors X X'. The contact-pieces are numbered in regular order in the diagram.

*First position.*—Upon reference to Fig. 1 it will be apparent that the current entering at 1 passes through $a$ to the coils $m'\,m^2$ to $b$, 2, 3, $c$, brush C, brush E, $e$, 5, 7, $g$, coils $m^3$, $m^4$, $h$, 8, thence to contact-piece 9, where it takes a similar course through the motor X'. In this position of the switch the upper poles A H of the field-magnets are both of the same polarity, and the lower ones B G of the other polarity, giving a bipolar machine. The horizontal brushes C E are the only ones in circuit. The field windings and armatures are in series in each motor, the two motors being also in series.

*Second position.*—The current enters at 1 and passes thence to $a$, $m'\,m^2$, $b$, 2, 3. Here it divides, part going through $c$ and brushes C F to $f$, 6, and the other part going through 5, $e$, E, D, $d$, 4, whence it unites with the current from 6 and passes to 8, $h$, $m^4$, $m^3$, $g$, 7, and thence to motor X'. The two motors are in series, the field and armature are four-poled, and the fields are in series with the armatures.

*Third position.*—The circuit through each motor is the same as in the second position of the switch; but the motors are in parallel instead of in series, the current entering at 1 dividing between 1 and 9.

*Fourth position.*—Here the fields and armatures are four-poled, the motors are in series, the individual fields are in series, and the armatures are four-poled in parallel. The current entering at 1 $a$ goes through $m'\,m^2$ to $b$, 2, 8, $h$, $m^4$, $m^3$, $g$ to 7, where it divides, part going to 5, where it divides through $e$, E, D, $d$, 4 and through 3, $c$, C, F, $f$, 6 and then unites and goes to 9. The other part of the current from 7 goes to 11, where it divides through $c$ C, F, $f$, 14, to 9 and through 13, $e$, E, D, $d$, 12, to 9. Here it unites with the current from 4 and 6 and the entire current goes through the coils $m'$, $m^2$, $m^4$, $m^3$ and out at 15.

*Fifth position.*—Here the four field-magnets in the two motors are in parallel, the armatures, which are four-poled, being also in parallel. The current divides between 1, 8, 9, and 16, each portion going through two field-magnet coils and then through two adjacent brushes of the commutator to a common return.

It is obvious that the invention is not limited to the special form of four-poled motor shown in the drawings, since it is readily applicable to other forms of multipolar machines. The switch is capable of various simple modifications, so as to provide, for instance, for cutting out either of the motors or reversing the current through the fields or armature. Moreover, by further mechanical change in the switch the invention may be applied to motors having any number of pole-pieces.

What I claim as new, and desire to secure by Letters Patent, is—

1. The combination with two electric motors each having pairs of pole-pieces of a switch arranged to connect said motors in series or in parallel and to alter them from bipolar to four-poled, or vice versa, substantially as described.

2. The combination with two electric motors each having four pole-pieces and four commutator-brushes of a switch arranged to connect said motors in series or in parallel and to alter them from bipolar to four-poled, or vice versa, substantially as described.

In witness whereof I have hereunto set my hand this 23d day of August, 1892.

JOHN C. HENRY.

Witnesses:
JOHN M. C. MARSH,
WM. W. GILBY.